United States Patent
Sato (10) Patent No.: US 10,204,516 B2
(45) Date of Patent: Feb. 12, 2019

(54) AUTOMOBILE AND COMPUTING SYSTEM

(71) Applicant: HATSUMEIYA CO, LTD, Tokyo (JP)

(72) Inventor: Kenji Sato, Tokyo (JP)

(*) Notice: Subject to any disclaimer, the term of this patent is extended or adjusted under 35 U.S.C. 154(b) by 15 days.

(21) Appl. No.: 15/328,038

(22) PCT Filed: Jul. 22, 2015

(86) PCT No.: PCT/JP2015/070820
§ 371 (c)(1),
(2) Date: Jan. 22, 2017

(87) PCT Pub. No.: WO2016/013574
PCT Pub. Date: Jan. 28, 2016

(65) Prior Publication Data
US 2017/0213457 A1    Jul. 27, 2017

(30) Foreign Application Priority Data
Jul. 23, 2014 (JP) ................ 2014-150003

(51) Int. Cl.
*G08G 1/09* (2006.01)
*B60R 21/00* (2006.01)
(Continued)

(52) U.S. Cl.
CPC ............ *G08G 1/09* (2013.01); *B60R 21/00* (2013.01); *B60W 30/06* (2013.01);
(Continued)

(58) Field of Classification Search
CPC ...................... G08G 1/09; G05D 1/0212
See application file for complete search history.

(56) References Cited

U.S. PATENT DOCUMENTS 8,660,734 B2 *  2/2014  Zhu .................. G06T 7/223
                                                   701/23
8,989,943 B2 *  3/2015  You .................. G05D 1/0297
                                                   180/170
(Continued)

FOREIGN PATENT DOCUMENTS

JP    H10-338057 A1    12/1998
JP    2001-005979 A1    1/2001
(Continued)

*Primary Examiner* — Alex C Dunn
(74) *Attorney, Agent, or Firm* — Culpepper IP, PLLC; Kerry S. Culpepper (57) ABSTRACT

Provided is a system whereby the self-driving capability or each vehicle can be improved by using not only an experience of own vehicle but also an experience of another vehicle. For example, suppose own vehicle (V1) has no experience of having traveled on a root (R). On the other hand, another vehicle (V2) has experienced traveling on the root (R). The another vehicle (V2) acquires various data pertaining to driving when traveling on the route (R), and stores the various data in an onboard storage device. The another vehicle (V2) provides information including the various data stored in the storage device to the own vehicle (V1) as experience information. The own vehicle (V1) can achieve self-driving capability at the same level as the another vehicle (V2) by performing self-driving control on the basis of the experience information of the another vehicle (V2), which has experience of having traveled on the root (R).

15 Claims, 9 Drawing Sheets

(51) Int. Cl.
*B60W 30/095* (2012.01)
*G05D 1/02* (2006.01)
*G08G 1/0967* (2006.01)
*B60W 50/14* (2012.01)
*B60W 30/06* (2006.01)

(52) U.S. Cl.
CPC .......... *B60W 30/095* (2013.01); *B60W 50/14* (2013.01); *G05D 1/0212* (2013.01); *G05D 1/0287* (2013.01); *G08G 1/096725* (2013.01); *G08G 1/096791* (2013.01); *B60W 2550/40* (2013.01); *B60W 2550/404* (2013.01); *B60W 2550/408* (2013.01); *G05D 2201/0213* (2013.01); *G08G 1/096775* (2013.01); *G08G 1/096783* (2013.01)

(56) References Cited

U.S. PATENT DOCUMENTS

| | | | | |
|---|---|---|---|---|
| 9,047,776 B2* | 6/2015 | Saka | ............... | G08G 1/096855 |
| 9,092,984 B2* | 7/2015 | Bahl | ............... | G08G 1/164 |
| 9,183,572 B2* | 11/2015 | Brubaker | ............... | G06Q 30/02 |
| 9,495,810 B2* | 11/2016 | Krishnamurthy | ........ | G07C 5/00 |
| 9,786,163 B2* | 10/2017 | Ioli | ............... | G08G 1/0145 |
| 2009/0037088 A1* | 2/2009 | Taguchi | ............... | B60W 30/095 701/117 |
| 2013/0179056 A1* | 7/2013 | Fukuyama | ............ | H04W 40/32 701/117 |
| 2014/0225749 A1* | 8/2014 | Saka | ................ | G08G 1/096855 340/905 |
| 2014/0254896 A1* | 9/2014 | Zhou | ...................... | B25J 9/0006 382/124 |
| 2014/0350777 A1* | 11/2014 | Kawai | .................. | G07C 5/0808 701/32.3 |
| 2015/0166072 A1* | 6/2015 | Powers | ................. | B60W 40/06 701/1 |
| 2015/0242944 A1* | 8/2015 | Willard | .............. | G06Q 30/0645 705/5 |
| 2015/0243114 A1* | 8/2015 | Tanabe | ................... | G07C 5/008 701/123 |

FOREIGN PATENT DOCUMENTS

| | | |
|---|---|---|
| JP | 2006-11383 A1 | 4/2006 |
| JP | 2008-018872 A1 | 1/2008 |
| JP | 2008-090568 A1 | 4/2008 |
| JP | 2008-298475 A1 | 12/2008 |
| JP | 2009-037561 A1 | 2/2009 |
| JP | 2010-134865 A1 | 6/2010 |
| JP | 2011-221698 A1 | 11/2011 |
| JP | 2012-108653 Ai | 6/2012 |
| JP | 2014-065392 A1 | 4/2014 |
| JP | 2014-125196 A1 | 7/2014 |
| WO | WO2012073359 A1 | 6/2012 |

* cited by examiner

AUTOMOBILE AND COMPUTING SYSTEM

CROSS REFERENCE TO RELATED APPLICATIONS

Priority is claims on Japanese application NO. 2014-150003, filed Jul. 23, 2014, the content of which, is incorporated herein by reference.

BACKGROUND OF THE INVENTION

1. Field of the Invention

The present invention relates to automate operation technology of a motor vehicle.

2. Description of the Related Art

Technology relates to an automatic operation of the vehicle have been proposed. Some of these technologies, there is an automatic operation learning function Patent Document 1-10).

1: JP, 2014-065392, A
2: JP, 2012-108653, A
3: JP, 2010-134865, A
4: JP, 2008-298475, A
5: JP, 2008-018872, A
6: JP, 2006-113836, A
7: JP, 2001-005979, A
8: JP, 10-338057, A
9: WO2012/077204
10: WO2012/073359

Automatic operation learning function in the prior art described above, obtains data regarding the operation during the operation of the vehicle is the vehicle, and improves the automatic operation performance of the vehicle on the basis of the acquired data. For this reason, the speed and the level of improvement of automatic operation performance is different for each vehicle. In addition, in the situation of the inexperience that is not learned, is only demonstrate automatic operation performance of the initial value.

SUMMARY OF THE INVENTION

In this there for an object of the present invention to provide a system whereby the self-driving capability of each vehicle can be improved by using not only the experience of a host vehicle but also the experience of another vehicle.

Structure of Automobile and Its Operation According to the Present Invention The automobile of the present invention include automobile having the following structure.

[Structure 1-1]
An automobile, comprising:
an experience information providing unit that provides an experience information of own vehicle to another vehicle, and
a receiving unit that receives an experience information of another vehicles.

Automotive each other, can be mutually provide experience information between vehicles. And, the experience information of the other vehicle can be used in automatic operation control of the vehicle. In the vehicle is inexperienced situation, by performing automatic driving control on the basis of experience information of the other vehicles who have experienced this situation can be addressed to the availability automatic operation performance of the other vehicle and the same level.

[Structure 1-2]
An automobile, comprising:
a receiving unit that receiver an experience information of another vehicle by communication between own vehicle and another vehicle, and
a control unit that performs driving control based on the experience information of the another vehicle.

Vehicles can provide experience information of other vehicles via inter-vehicle communication. Then, experience information of other vehicles can be used for automate driving control of the own vehicle. Even in the situation where the own vehicle is inexperienced, the automatic driving control is performed based on the experience information of the other vehicle that may have experienced the situation, so that the situation can be coped with the automatic driving performance equivalent to that of the other vehicle.

[Structure 1-3]
An automobile, comprising:
a receiving unit that receives an experience information of another vehicle by communication between own vehicle and a ground stationary object, and
a control unit that performs driving control based on the experience information of the another vehicle.

An automobile can receive experience information of another vehicle by communicating with a stationary object on the ground. Then, experience information of other vehicles can be used for automatic driving control of the own vehicle. Even in the situation where the own vehicle is inexperienced, the automatic driving control is performed based on the experience information of the other vehicle that has experienced the situation, so that the situation can be coped with the automatic driving performance equivalent to that of the other vehicle.

[Structure 1-4]
An automobile, comprising:
a receiving unit that receives an experience information of another vehicle by communication between own vehicle and a road, and
a control unit that performs driving control based on the experience information of the another vehicle.

An automobile can receive experience information of another vehicle by communicating with a road. Then, experience information of other vehicles can be used for automatic driving control of the own vehicle. Even in the situation where the own vehicle is inexperienced, the automatic driving control is performed based on the experience information of the other vehicle that may have experienced the situation, so that the situation can be coped with the automatic driving performance equivalent to that of the other vehicle.

[Structure 1-5]
An automobile, comprising:
a receiving unit that receives an experience information of another vehicle by communication between own vehicle and a mobile terminal,
a control unit that performs driving control based on the experience information of the another vehicle.

An automobile can receive experience information of another vehicle by communicating with a portable terminal. Then, experience information of other vehicles can be used for automatic driving control of the own vehicle. Even in the situation where the own vehicle is inexperienced, the automatic driving control is performed based on the experience information of the other vehicle that has experienced the situation, so that the situation can be coped with the automatic driving performance equivalent to that of the other vehicle.

[Structure 1-6]

An automobile, comprising:

a uploading unit that uploads an experience information of own vehicle to a server on a network, a downloading unit that downloads an experience information, of another vehicle from the server on the network, and a control unit that performs driving control based on the experience information of downloaded from the server on the network.

An automobile can provide experience information to and from a large number of cars via a network. Then, experience information of other vehicles can be used for automatic driving control of the own vehicle. Even in the situation where the own vehicle is inexperienced, the automatic driving control is performed based on the experience information of the other vehicle that may have experienced the situation, so that the situation, can be coped with the automatic driving performance equivalent to that of the other vehicle.

[Structure 1-7]

An automobile can provide experience information to and from a large number of cars via a network. Then, experience information of other vehicles can be used for automatic driving control of the own vehicle. Even in the situation where the own vehicle is inexperienced, the automatic driving control is performed based on the experience information of the other vehicle that may have experienced the situation, so that the situation can be coped with the automatic driving performance equivalent to that of the other vehicle.

An automobile can provide experience Information to and from a large number of cars via a network. Then, experience information of other vehicles can be used for automatic driving control of the own vehicle. Even in the situation where the own vehicle is inexperienced, the automatic driving control is performed based on the experience information of the other vehicle that have experienced the situation, so that the situation can be coped with the automatic driving performance equivalent to that of the other vehicle.

Structure of the Computing System and Its Operation of According to the Present Invention The computing system of the present invention includes a computing system having the following structure.

[Structure 2-1]

A computing system, comprising:

an experience information receiving unit that receives an experience information of one or multiple vehicles via the internet;

an experience information transmitting unit that transmits the experience information via the internet to one or multiple vehicles which different from transmission source of the experience information.

The computing system receives experience information of one or more vehicles via the Internet and transmits the experience information to one or a plurality of vehicles different from a sender of the experience information via the internet. A vehicle that has received experience information from a competing system can use the experience information for automatic driving control of the host vehicle. Even in the situation where the own vehicle is inexperienced, the automatic driving control is performed based on the experience information of the other vehicle that may have experienced the situation so that the situation can be coped with with the automatic driving performance equivalent to that of the other vehicle.

Structure 2-2

A computing system, comprising:

an experience information receiving unit that receives an experience information of one or multiple vehicles via the internet;

an optimized information generating unit that generates an optimized experience information, based on said experience information; and an optimization information update function to manage and update the optimized experience information to up-to-date, an experience information transmitting unit that transmits said optimized experience information to one or multiple vehicles via the internet.

The computing system receives experience information of one or more vehicles via the Internet. The computing system generates experience information optimized based on the experience information. The computing system updates the optimized experience information to the latest information. The computing systems transmits it to one or more vehicles via the Internet.

A vehicle that has received experience information from this computing system can use the experience information for automatic driving control of the vehicle. Automatic driving control is performed based on experience information optimized on the basis of experience information of another vehicle that may have experienced the situation even in a situation where the own vehicle is inexperienced, so that the same level as the other vehicle This situation can be dealt with the above automatic operation performance.

[Structure 2-3]

A computing system of Structure 2-1, wherein said optimized experience information is the experience information that energy consumption is optimized so as to minimize.

[Structure 2-4]

A computing system of Structure 2-2, wherein said optimized experience information is the experience information that regenerative energy is optimized so as to maximize.

[Structure 2-5]

A computing system of Structure 2-2, wherein said optimized experience information is the experience information that was optimized so as to minimize the acceleration count or acceleration time at a predetermined travel distance or a predetermined travel time.

[Structure 2-6]

A computing system of Structure 2-2, wherein said optimized experience information is the experience information that was optimized so as to minimize or maximize the number of times of braking or braking time at a predetermined travel distance or a predetermined traveling time.

[Structure 2-7]

A computing system of Structure 2-2, wherein said optimized experience information is the experience information that was optimized so that a distance traveled from a departure point to an arrival point is minimized.

[Structure 2-8]

A computing system of Structure 2-2, wherein said optimized experience information is the experience information that was optimized so that traveling time from a departure point to an arrival point is minimized.

[Structure 2-9]

A computing system of Structure 2-2, wherein said optimized experience information is the experience information that it was optimized so that the possibility that a vehicle of a provide destination of the experience information comes in contact with an obstacle becomes minimum.

Effect of the Invention

According to the present invention, since the experience information of the other vehicle can be used for automatic driving control of the vehicle, even in a situation of the own vehicle is inexperienced, automatic operation based on the experience information of the other vehicles who have experienced this situation by performing the control, we can address the availability automatic operation performance of the other vehicle and the same level.

Additional objects and aspect of the present invention will be apparent from the following detailed description of preferred embodiments thereof, which are best understood with reference to the accompanying drawings.

BRIEF DESCRIPTION OF THE DRAWINGS

FIG. 11 A is an explanatory diagram of the embodiment premised on FIG. 9 and FIG. 10.

FIG. 11 B is an explanatory diagram of the embodiment premised on FIG. 9 and FIG. 10.

DESCRIPTION OF THE SPECIFIC EMBODIMENTS

Description of Terms and the Like

The computing system of the present invention includes a cloud competing system. Cloud computing is one of distributed computing using the Internet.

A cloud refers to a data center for realizing cloud computing and a group of server computers operated in the cloud computing.

With the cloud technology, large capacity dais can be processed without being aware of the location of data on the Internet.

Examples of the "experience information" include information associating the driving operation amount with the driving situation of the vehicle, information relating the traveling route of the vehicle and energy consumption, information associating the traveling path of the vehicle with the regenerative energy absorption rate, and the like. Experience information includes learning information based on various data obtained at the time of manual driving and learning information based on various data obtained at driving assisted driving, learning information based on various data obtained at the time of only automatic driving. The learning information includes learning information on the driving operation amount, learning information on the detected object, and the like.

Examples of the "driving situation" include running speed, the positional relationship between the host vehicle and the surrounding objects, the distance between the host vehicle and surrounding objects, the current position (latitude and longitude) of the host vehicle, the traveling route, the surrounding brightness. The weather, the number of lanes, the width of the running lane, the road shape, the road gradient, the type of the road surface, the road surface condition, the display content of the traffic signal, the number of surrounding vehicles, the vehicle speed in the front, the acceleration of the vehicle in the front, Type, and the like. The surrounding objects include vehicles, stationary objects on the ground, and the like. Standing still objects include shoulder, guardrail, garage, utility pole, traffic lights, houses, and the like.

Examples of the "driving operation amount" include an operation amount (accelerator operation amount) for adjusting the propulsive force of the host vehicle, at operation amount (brake operation amount) for adjusting the braking force of the own vehicle, a steering angle or an operation amount (steering operation amount) for adjusting the steering angular velocity, and the like.

Examples of the "detected object" include pedestrians, other vehicles, shoulder, utility pole, traffic signal, crosswalk, various signs, and the like.

An operation control method is known in which a drivers driving operation at the time of manual operation is machine learned and the driving support control or the automatic driving control is executed with reference to the learning result. Also in the automobile and the computing system of the present invention, this type of machine learning operation control method can be used.

A general purpose image recognition system capable of detecting any object such as a vehicle or a pedestrian is known. Also in the automobile and the computing system of the present invention, a well-known general-purpose image recognition system can be used. As a method for detecting pedestrians and other vehicles, it is known that HOG (Histograms of Oriented Gradients) feature amount extraction, threshold learning by SVM (Support Vector Machine) which is one of machine learning methods, etc.

System Configuration Example

Figure 1:
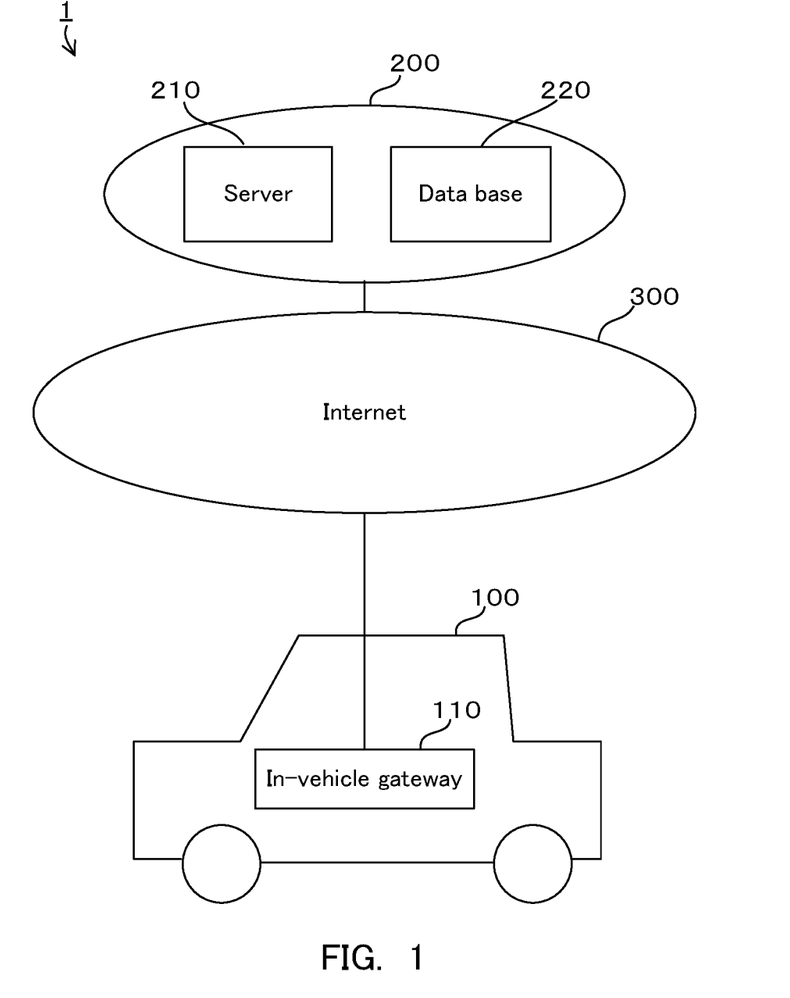
FIG. 1 is a conceptual diagram showing an example of a system configuration including the automobile of the present invention and the computing system of the present invention.

FIG. 1 is a conceptual diagram showing an example of a system configuration including a car of the present invention and a computing system of the present invention.

A cloud computing system (hereinafter simply referred to as a cloud) 200 includes a server computer 210 and a database 220. The server computer 210 receives experience information of a large number of vehicles including the automobile 100 via the Internet 300. The server computer 210 stores the received experience information in the database 220. The server computer 210 transmits the experience information extracted from the database 220 to a large number of vehicles including the automobile 100 via the Internet 300. The server computer 210 may be a single computer or a plurality of servers. The database 220 may be arranged in one server computer or distributed among a plurality of server computers.

The automobile 100 includes an in-vehicle gateway 110.

The in-vehicle gateway 110 is an information processing apparatus having a wireless communication function mainly including a CPU (Central Processing Unit), a ROM (Read Only Memory), a RAM (Random Access Memory), and the like which are not shown. The in-vehicle gateway 110 executes various processes by executing the control program stored in the ROM by the CPU. The in-vehicle gateway 110 uploads various data in the cloud 200 via the Internet 300 (transmits the data to the server computer 210), and downloads (receives from the server computer 210) various data from the cloud 200 via the Internet 300. Data transmitted and received between the automobile 100 and the cloud 200 includes data of experience information of the own vehicle and data of experience information of other vehicles.

Figure 2:
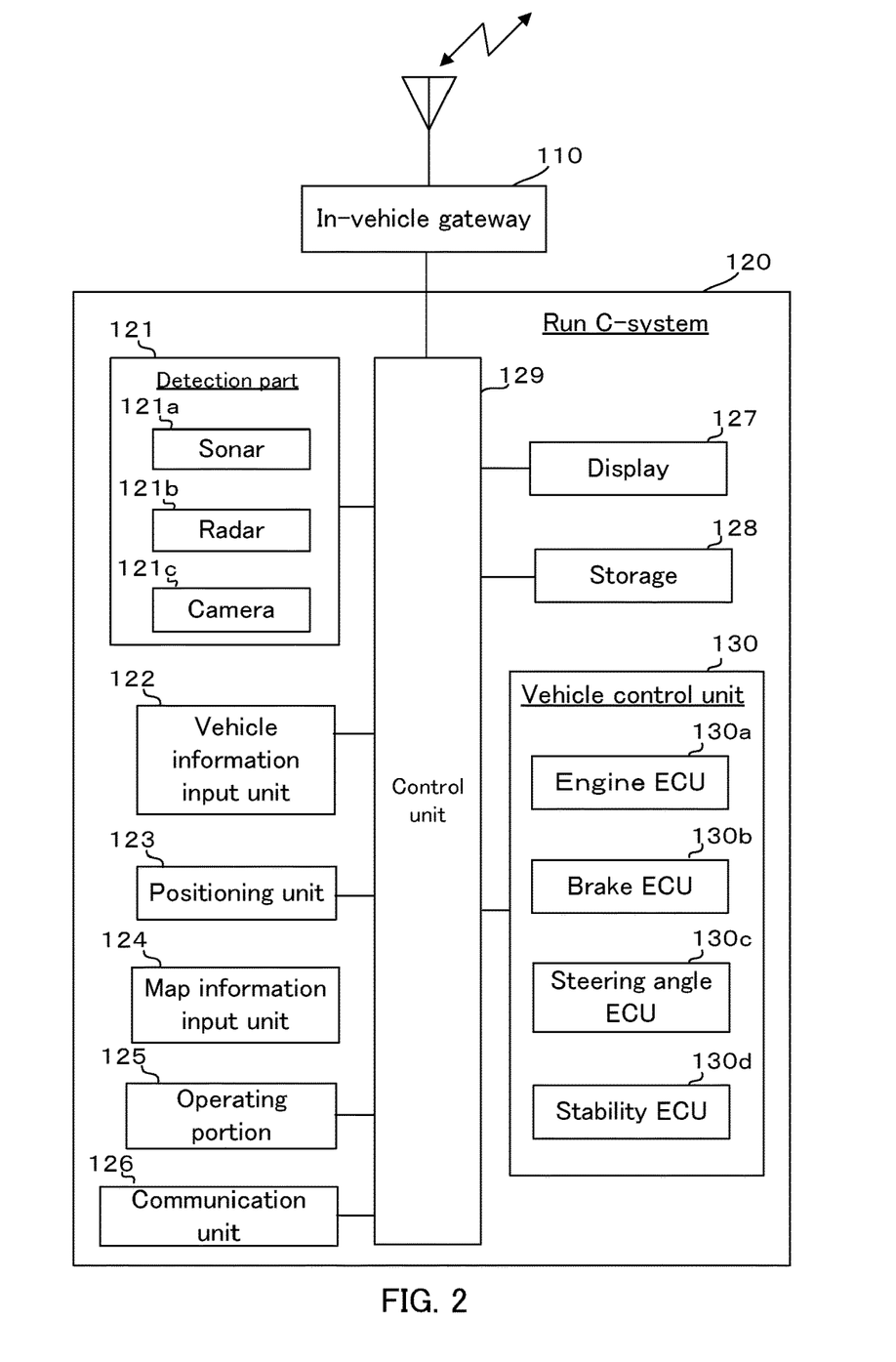
FIG. 2 is a functional block diagram showing an example of a system configuration of a vehicle of the present invention.

FIG. 2 is a functional block diagram showing an example of the system configuration of the automobile of the present invention.

The automobile 100 has an in-vehicle gateway 110 and a travel control system 120.

The in-vehicle gateway 110 communicates with the cloud 200 under the control of the driving control system 120. The in-vehicle gateway 110 inputs data received from the cloud 200 to the travel control system 120. The in-vehicle gateway 110 transmits the data input from the travel control system 120 to the cloud 200.

The travel control system 120 includes a detection unit 121, a vehicle information input unit 122, a positioning unit 123, a map information input unit 124, an operation unit 125, a communication unit 126, a display unit 127, a storage unit 129, a control unit 129, and the like.

The detection unit 121 is composed of sensors for detecting the position, the relative speed, and the size of the surrounding vehicles traveling in the same direction as the own vehicle on the lane on which the subject vehicle travels and on the adjacent lane. The detection unit 121 is embodied by, for example, a sonar 121 *a*, a radar 121 *b*, a camera 121 *c* or the like.

The sonar 121*a* transmits ultrasonic waves from the respective antennas directed in the front, rear, left and right directions of the vehicle to a predetermined region and receives the reflected waves. Then, on the basis of the received reflected wave, the positional relationship, the distance, and the like with respect to the subject vehicle are output for the objects existing in the front, rear, left and right directions of the own vehicle. The radar 121 *b* scans a predetermined detection area by irradiating a laser beam or a millimeter wave from an antenna directed in the front, rear, left and right directions of the vehicle, and receives the reflected wave. Then, based on the received reflected wave, the positional relationship, the distance, the relative speed, and the like with respect to the subject vehicle are output for the objects existing in the front, rear, left and right directions of the vehicle. The camera 121 *c* is provided at a predetermined position in the front, rear, left and right directions of the own vehicle, and outputs imaging data of surrounding vehicles existing in the front, rear, left and right directions of the own vehicle. It should be noted that a plurality of sensors such as these sonar, radar, camera 121 *c*, and the like may be used in combination, or may be used alone.

The vehicle information input unit 122 inputs information indicating the traveling state of the vehicle concerning travel control to the control unit 128. The information indicating the running state of the host vehicle includes the driving operation amount.

The positioning unit 123 measures the present location of the own vehicle. The positioning unit 123 is embodied in a high-accuracy positioning receiver or the like corresponding to a high-accuracy GPS (Global Positioning System), for example.

The map information input unit 124 acquires information about the road on which the host vehicle is currently traveling from the storage medium that stores the road map information, and inputs the information to the control unit 128. Examples of road information input by the map information input unit 128 include information such as the number of lanes, the lane width, curvature, gradient, continence, regulation, and the like.

The operation unit 125 is an input device for inputting operation instructions such as on/off control of running control, control of a control mode, switching of various displays on the display unit 127, and the like, and is provided, for example, a switch which provided at a spoke portion of a steering wheel.

The communication unit 126 is a communication device for communicating with a communication device provided on a stationary object on the ground and a communication device mounted on a peripheral vehicle. Standing still objects include garages and roads.

The display unit 127 is a display device including a center display provided in the center portion of the instrument panel and an indicator provided in the meter panel. On the display unit 127, information indicating the state of the host vehicle, on/off control of the travel control, and a control mode are displayed. The control modes include a manual operation mode, a driving support mode, and an automatic operation mode.

The storage unit 128 is a storage device that stores empirical information of the subject vehicle and experience information of other vehicles.

The control unit 129 is an information processing device mainly composed of a CPU, a ROM, a RAM, etc. (not shown), and performs overall control of each unit of the travel control system 120. The control unit 129 executes various processes by executing the control program stored in the ROM by the CPU.

The control unit 129 accumulates the experience information of the subject vehicle based on various information input from the detection unit 121, the vehicle information input unit 122, the positioning unit 123, and the map information input unit 124 in the storage unit 19. The experience information of the subject vehicle includes various data (time series information and the like) obtained by the detection unit 121, the vehicle information input unit 122, the positioning unit 123, and the map information input unit 124 and the various data as input data. And a result (learning information) obtained by calculation using a predetermined learning algorithm.

The control unit 129 communicates with the cloud 200 via the in-vehicle gateway 110.

The control unit 129 transmits the experience information of the own vehicle accumulated in the storage unit 128 to the cloud 200 via the in-vehicle gateway 110.

The control unit 129 accumulates the experience information of the other vehicle received via the in-vehicle gateway 110 in the storage unit 128. The experience information of the other vehicle includes various data (time series information and the like) obtained by the detection unit 121 of the other vehicle, the vehicle information input unit 122, the positioning unit 123, and the map information input unit 124 and the various data And a resell (learning information) obtained by computing as input data by a predetermined learning algorithm.

The control unit 129 communicates with surrounding ground, stationary objects and surrounding vehicles via the communication unit 126.

The control unit 129 transmits the experience information of the host vehicle accumulated in the storage unit 128 to the ground stationary object and surrounding vehicles via the communication unit 126.

The control unit 129 accumulates the experience information of the other vehicle received via the communication unit 126 in the storage unit 128.

To the control unit 129, a vehicle control unit 130 to be controlled by the traveling control is connected.

The vehicle control unit 130 includes various electronic control devices such as an engine ECU (Electronic Control Unit) 130 a, a brake ECU 130 b, a steering angle ECU 130 c, a stability ECU 130 d, and the like. The engine ECU 130 a issues a control command according to the operation amount of the accelerator pedal and the state of the engine, and controls the output of the engine. The brake ECU 130b controls the braking force of the brake according to the operation amount of the brake pedal. The steering angle ECU 130 c controls the steering angle of the steering wheel. The stability ECU d controls the traveling stability of the vehicle.

The control unit 129 controls the running of the vehicle by giving commands to each ECU in the vehicle control unit 130 according to the driving operation amount (accelerator operation amount, brake operation amount, steering operation amount, etc.).

In the driving support mode, the control unit 129 analyzes, in real time, the driving situation of the host vehicle that changes every moment, and based on the analysis result and experience information of the own vehicle and/or experience information of another vehicle, driving Generates support information, and informs the driver of the driving support information using the display unit 127 or the like.

In the automatic operation mode, the control unit 129 analyses the traveling situation of the host vehicle that changes every minute in real time, and based on the analysis result and experience information of the subject vehicle and/or experience information of another vehicle. Determines an operation amount, and gives a command to each ECU in the vehicle control section 130.

The vehicle 100 configured as described above performs driving support and automatic driving based on the driving situation of the host vehicle and experiential information of the own vehicle or experience information of another vehicle.

In the above example, the in-vehicle gateway 110 and the travel control system 120 are separately present, but the in-vehicle gateway 110 can be integrated with the travel control system 120.

Embodiment 1

Figure 3:
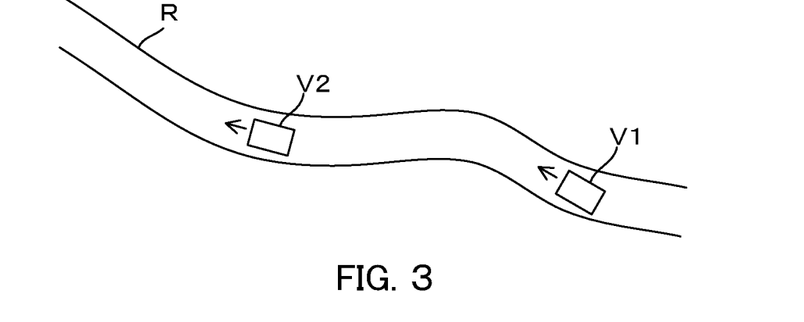
FIG. 3 is an explanatory view of an embodiment of a car of the present invention.
Figure 4:
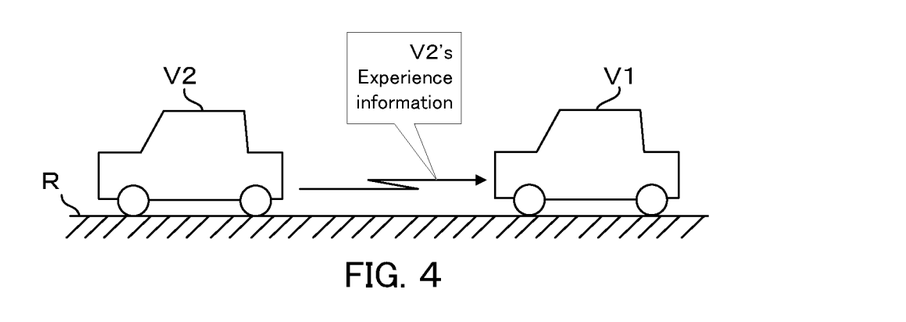
FIG. 4 is an illustration of the automobile embodiment of the present invention.

FIG. 3 is an explanatory view of an embodiment of a car of the present invention.

The automobile V 1 (100) has no experience of traveling on the traveling route R.

The automobile V 2 (100) has experienced traveling on the traveling route R.

When the vehicle V 2 travels on the traveling route R, the automobile V 2 acquires various data relating to driving and stores the various data in the storage unit 128 of the own vehicle. The automobile V 2 provides information including the various data stored in the storage unit 128 to the automobile V 1 as experience information.

The automobile (own vehicle) V 1 can use the experience information of the automobile (other vehicle) V 2 for driving support control and automatic driving control of the own vehicle V 1. The automobile V 1 has no experience of traveling on the traveling route R, but by performing driving support control and automatic driving control based on experience information of an automobile (other vehicle) V 2 having experience of traveling on the traveling route R. It is possible to demonstrate the driving support performance and the automatic driving performance equivalent to those of the vehicle V 2.

The method of delivering experience information from the automobile V 2 to the automobile V 1 is arbitrary 4), communication between the host vehicle V 1 and the ground stationary object 410 (see FIG. 5), the communication between the host vehicle V 1 and the road 420 and between the host vehicle V 1 and the other vehicle V 2 (See FIG. 6), communication between the host vehicle V 1 and the portable terminal 500 (see FIG. 7), information exchange via the cloud 200 (see FIG. 8), and the like.

Figure 5:
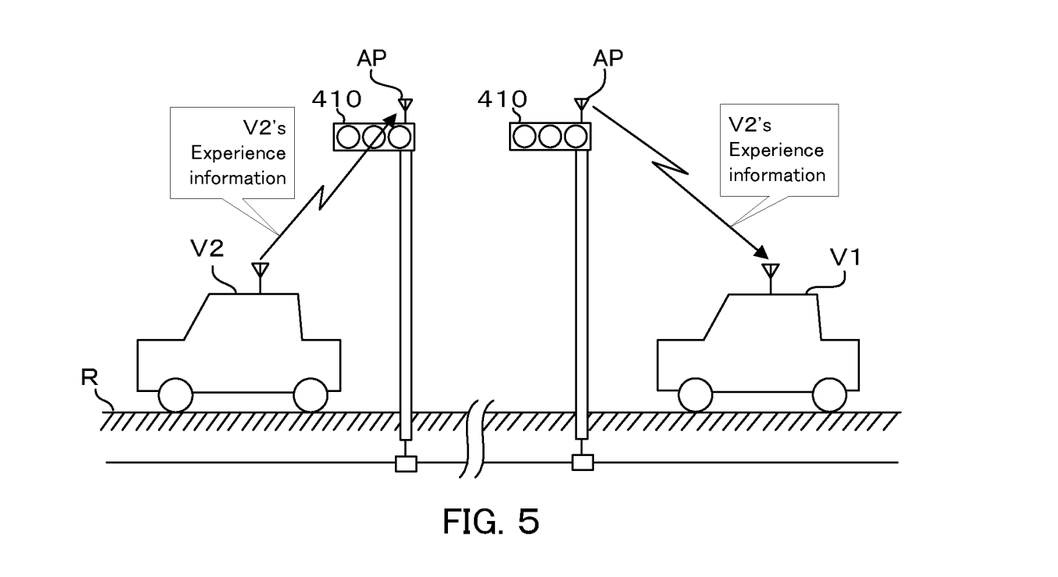
FIG. 5 is an explanatory diagram showing an example of a method of passing empirical information from another vehicle to the subject vehicle.

In FIG. 5, a traffic signal of a road is exemplified as the ground stationary object 410. The vehicles V 1 and V 2 transmit and receive experience information by using the traffic light 410 for an access point (AP). In the example of FIG. 5, the experience information of the automobile V 2 transmitted from the automobile V 2 is received by the automobile V 2 via the traffic light 410.

Figure 6:
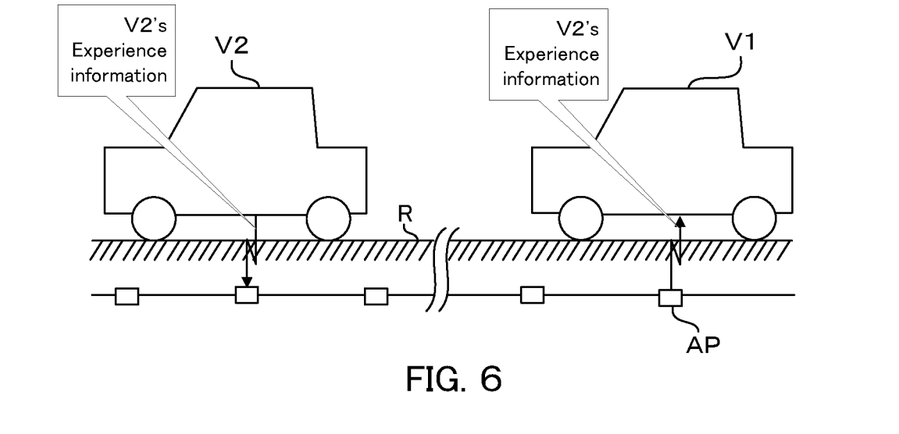
FIG. 6 is an explanatory diagram showing an example of a method of passing empirical information from another vehicle to the subject vehicle.

Note that the traffic light 410 that receives the experience information and the traffic light 410 that transmits the experience information may be the same traffic light or different traffic lights. In the example of FIG. 6, access points (AP) are arranged at predetermined intervals along the road. The access point (AP) may be buried in the road surface or may be provided on the side of the road.

Figure 7:
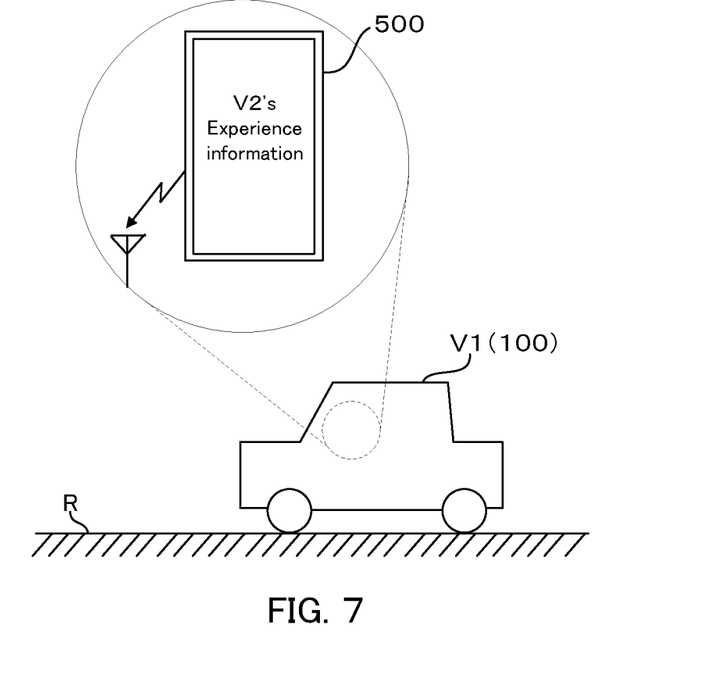
FIG. 7 is an explanatory diagram showing an example of a method of passing empirical information from another vehicle to the subject vehicle.

In the example of FIG. 7, the experience information of the automobile (other vehicle) V 2 is stored is the portable terminal 500 of the driver of the automobile (subject vehicle) V 1. The experience information is downloaded from the cloud 200 to the portable terminal 430. Experience information of the automobile (other vehicle) V 2 is transmitted from the mobile terminal 430 to the automobile V 1 by short-range wireless communication in the car of the automobile V 1.

Figure 8:
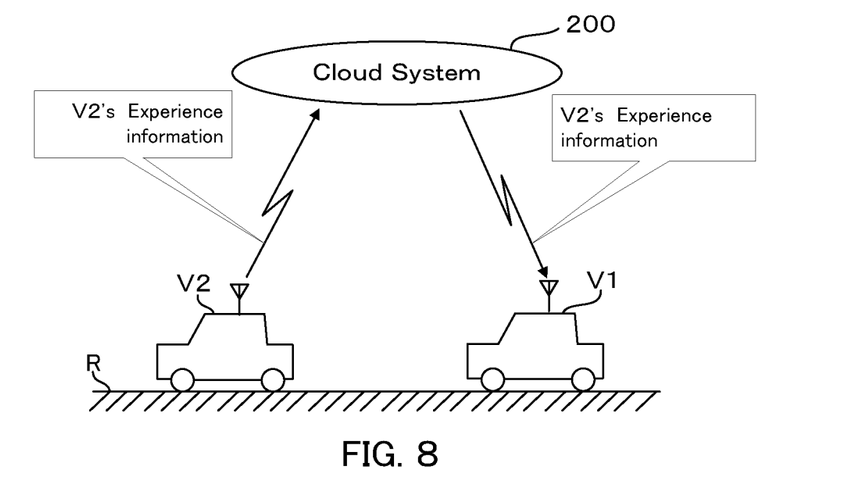
FIG. 8 is an explanatory diagram showing an example of a method of passing empirical information from another vehicle to the subject vehicle.

The configuration of FIG. 8 is an access point for accessing the ground stationary object 410 shown in FIG. 5 or the road 420 shown in FIG. 6 as an access point for the vehicles V 1 and V 2 to communicate with the cloud 200 via the Internet 300 AP) that can be realized.

Embodiment 2

Figure 9:
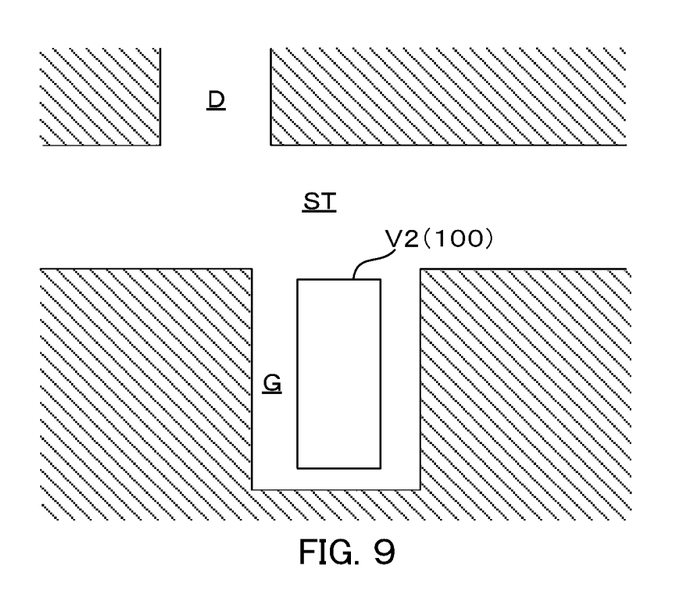
FIG. 9 is an explanatory diagram of another embodiment of the automobile of the present invention.

FIG. 9 is an explanatory view of another embodiment of the automobile of the present invention.

Garage G is a garage that vehicle V 2 (100) uses everyday.

Since the garage G faces the narrow road ST, it is difficult for inexperienced drivers to put the car in the garage.

On the diagonally forward left side of the garage G, there is a concave portion D having a shape branched from the road ST.

Figure 10A:
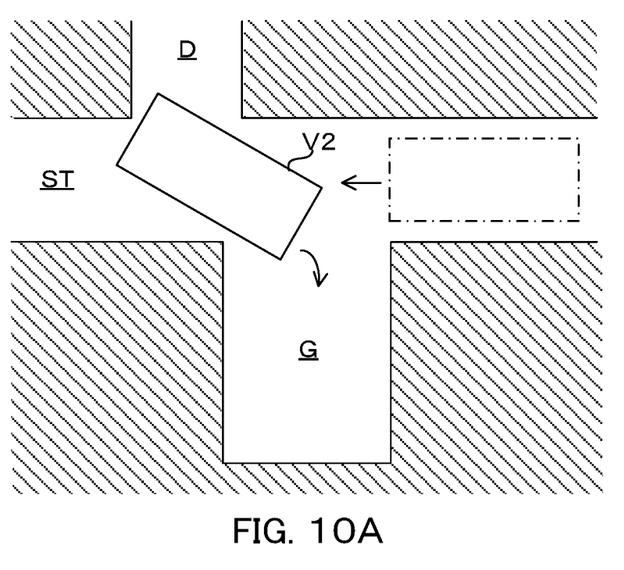
FIG. 10A is an explanatory diagram following FIG. 9.
Figure 10B:
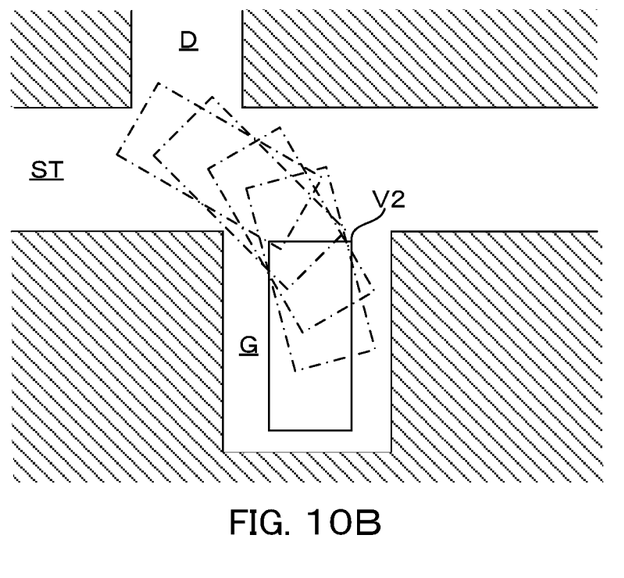
FIG. 10B is an explanatory diagram following FIG. 9.

In order to put the automobile V 2 in the garage G, firstly, as shown in FIG. 10A, the automobile V 2 has to be advanced obliquely to the right until the right tip of the automobile V 2 enters the recess D. Thereafter, as shown in FIG. 10B, the car V 2 must be advanced while carefully adjusting the snake angle so that the trajectory will draw an arc.

When the vehicle V 2 enters the garage G, the automobile V 2 acquires various data relating to driving and stores the various data in the storage unit 128 of the vehicle. The automobile V 2 provides the information, including the various data stored in the storage unit 128 an experience information to the automobile V 1 (100). The method by which the automobile V 2 provides the experience information, to the automobile V 1 is arbitrary.

Figure 11A:
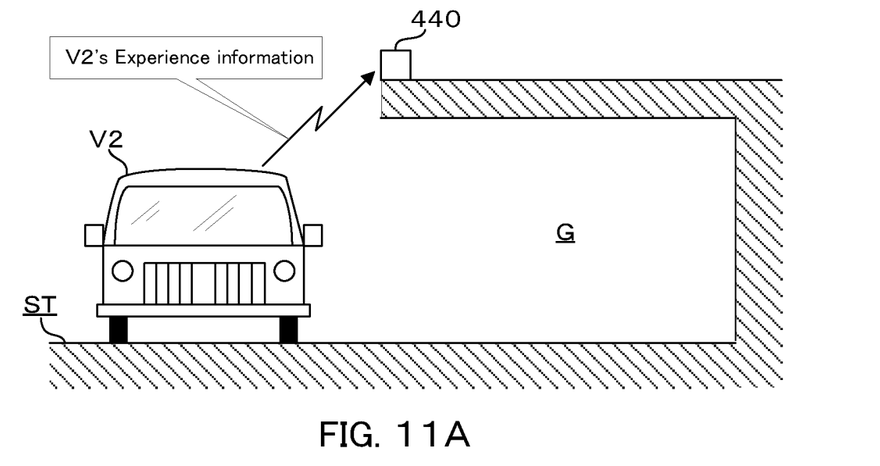
Figure 11B:
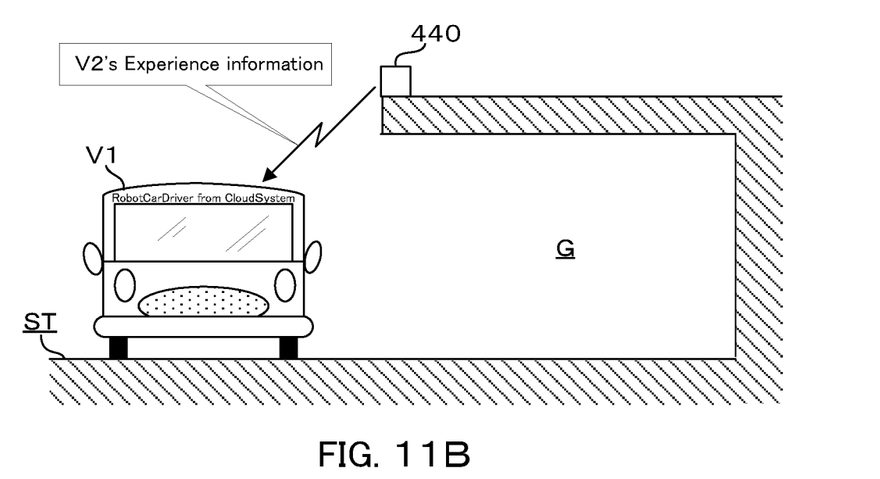

FIG. 11A, 11B exemplifies a case where experience information is exchanged by communication between the automobiles V 1, V 2 and the garage G. In the example of FIG. 11A, 11B, a garage parking experience providing apparatus 440 is provided near the entrance of the garage G. An shown in FIG. 11A, the garage parking experience providing apparatus 440 receives the experience information from the automobile V 2 (experience information reception function) and stores the experience information in the storage-unit (experience information storage function). Then, as shown in FIG. 11B, when the automobile V 1 approaches the garage G, garage parking experience providing apparatus 440 transmits the experience information stored in the storage unit to the automobile V 1.

Embodiment 3

Figure 12:
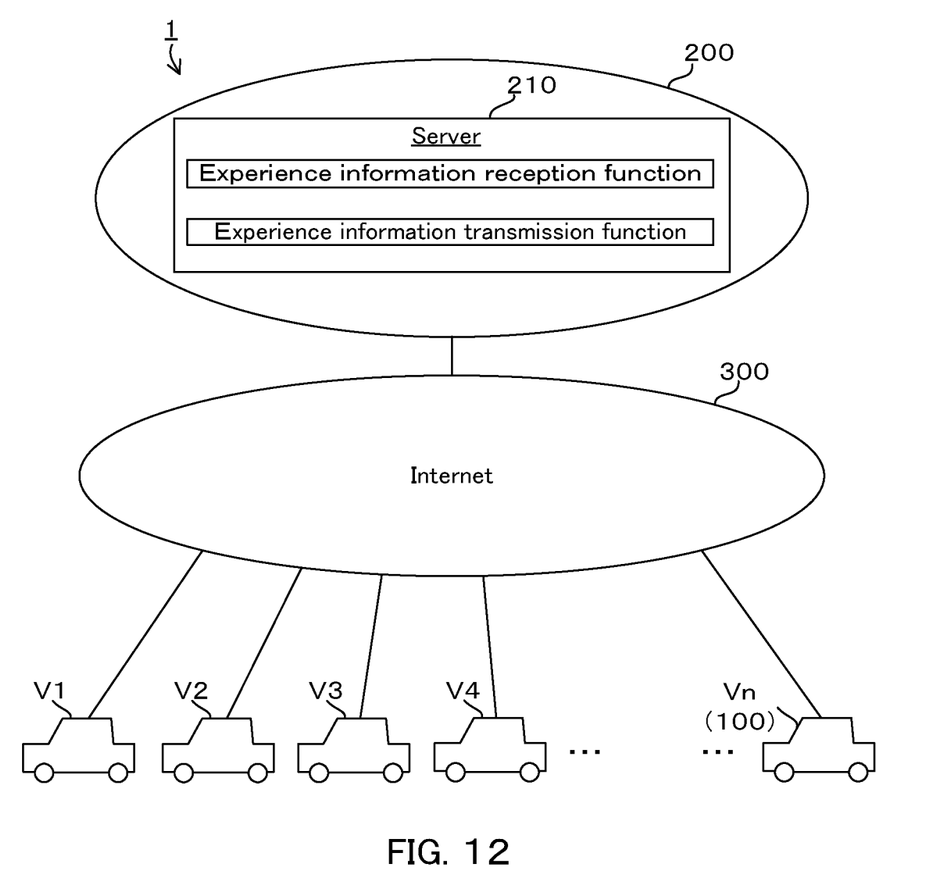
FIG. 12 is a conceptual diagram showing an example of an embodiment of the computing system of the present invention.

FIG. 12 is a conceptual diagram, showing a configuration example of the computing system of the present invention.

The server computer 210 in the cloud 200 receives the experience information of one or a plurality of the automobiles V 1, V 2, V 3, . . . , Via the Internet (experiential information receiving function), and stores the experience information as the source of the experience information To the different one or a plurality of vehicles V 1, V 2, V 3, . . . , via the Internet 300 (experience information transmission function). A vehicle that has received experience information from the server computer 210 can use the experience information for driving support control and automatic driving control of the own vehicle. Even in a situation where the host vehicle is inexperienced, by performing the driving support control and the automatic driving control based on the experience information of the other vehicle that may have experienced the situation, it is possible to obtain the driving support performance equivalent to that of the other vehicle and the automatic driving We can deal with this situation with performance.

According to this system, a large number of automobiles V1, V2, V3, . . . , Vn existing on the earth utilize experience information to each other, thereby efficiently improving driving support performance and automatic driving performance of each vehicle. That is, a large number of automobiles V1, V2, V3, . . . , Vn existing on the earth utilize the experience of the own vehicle as well as the experience of other vehicles to improve the driving support performance and the automatic driving performance of each vehicle, can be realized.

Embodiment 4

Figure 13:
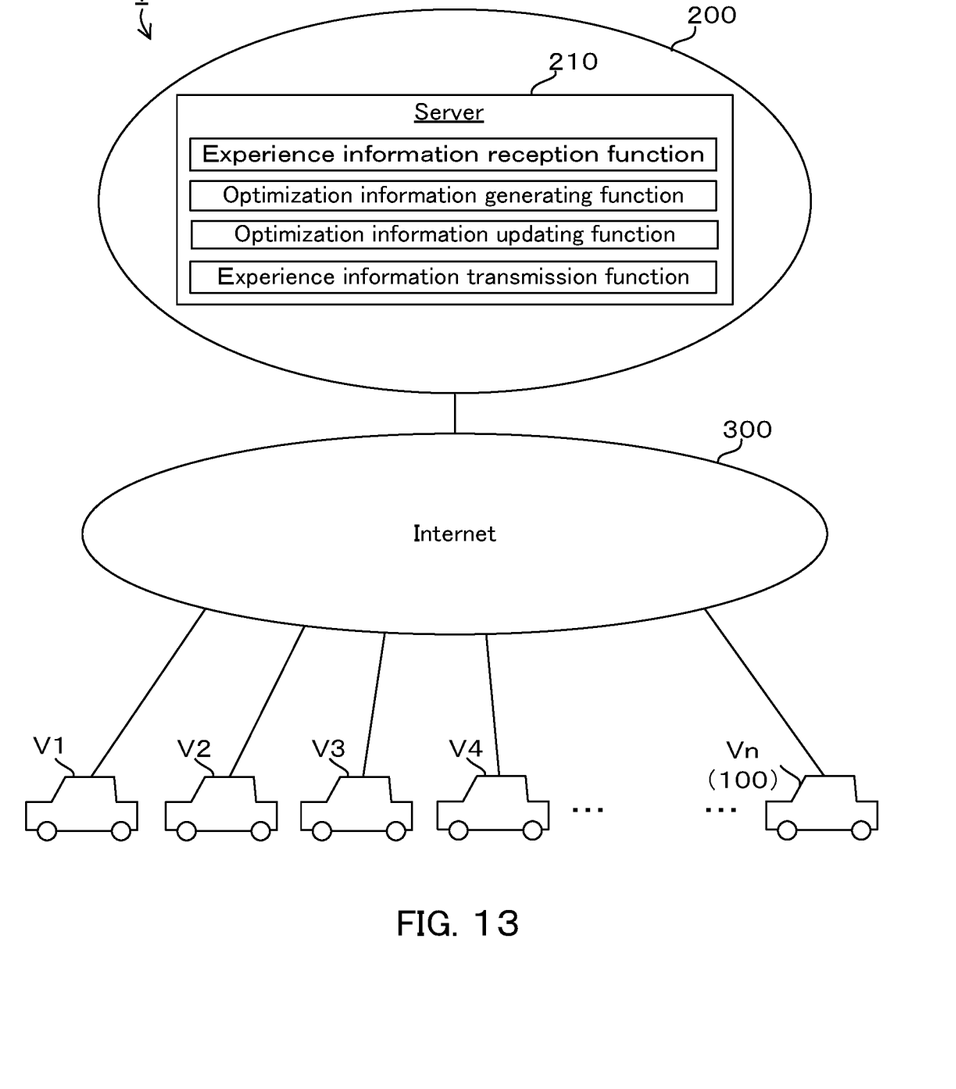
FIG. 13 is a conceptual diagram showing an example of another embodiment of the computing system of the present invention.

FIG. 13 is a conceptual diagram showing another configuration example of the computing system of the present invention.

The server computer 210 in the cloud 200 receives experience information of one or more vehicles via the Internet 300 (experience information reception function), generates experience information optimized based on the experience information (optimization information Creation function), updates the optimized experience information to the latest information and manages it (optimization information update function), and transmits to the one or more vehicles via the Internet (experience information transmission function). A vehicle that has received experience information from the server computer 210 can use the experience information for automatic driving control of the host vehicle. Even in a situation where the own vehicle is inexperienced, driving support control and automatic driving control are performed based on experience information optimized based on experience information of another vehicle that may have experienced the situation, so that the other vehicle It is possible to cope with this situation with the same level of driving support performance or higher and automatic driving performance.

According to this system, it is possible to efficiently optimize the driving support performance and the automatic driving performance of a large number of vehicles V1, V2, V3, . . . , Vn existing on the earth for each vehicle. The object of optimization includes energy consumption, regenerative energy, accident occurrence rate, and the like.

In the above embodiment, in the cloud 200, in the case where the vehicle type of the automobile from which the experience information is provided and the vehicle to which the experience information is provided and the dimensions of the respective parts of the vehicle body are different, empirical information to an optimum value.

In a case where the vehicle type and the dimensions of each part of the vehicle body of the own vehicle that is the provider of the experience information are different from each other, the automobile 100 sets the provided experience information to an optimum value according to the type of the vehicle of the own vehicle It is desirable to modify it.

Application Example (1) An insurance company or the like uses the computing system of the present invention. Insurance companies etc. provide recommended experience information.

The automobile 100 downloads the recommended experience information from the cloud 200.

When the automobile 100 travels in the automatic driving mode using the recommended experience information, the insurance premium of the automobile 100 becomes less expensive depending on the traveling distance, the number of times of traveling, and the like.

(2) Upload experience information obtained when a professional driver (taxi driver, etc.) was driven to the cloud 200.

The professional driver or the organization (such as a taxi company) to which the driver of the professional belongs obtains the price of providing experience information.

(3) Select excellent drivers (such as eco drivers), excellent vehicles (such as eco vehicles), etc. based on experience information.

Excellent drivers, excellent vehicles, etc. are awarded.

EXPLANATION OF TERMS

100: Automobile 110: Automotive Gateway 120: Traveling control system 200: Cloud computing system (Computing system) 210: Server computer 220: Database 300: Internet 410: Signal machine (Above-the-ground stationary object) 420: Road (Above-the-ground stationary object) 440; garage parking experience providing apparatus 500: Mobile terminal G: Garage (Above-the-ground stationary object) V1: Own vehicle V2: Another vehicle

What is claimed is:

1. A computing system that provides an automobile with an experience information of another vehicle, wherein the computing system provided with a server computer;
said server computer, comprising:
an experience information receiving unit that receives the experience information of one or multiple vehicles and stores the experience information in an associated database;
an optimized information generating unit that generates an optimized experience information, based on said experience information, and
an experience information transmitting unit that transmits said optimized experience information to one or multiple vehicles, wherein said experience information received by said experience information receiving unit is the experience information associating a driving operation amount and a driving situation of each vehicle,
said automobile, comprising:
a receiving unit that receives an experience information of another vehicle,
an input unit that inputs information on a running situation of an own vehicle; and
a control unit, wherein, said control unit analyzes the running situation of the own vehicle which constantly changes in real time, based on the information from said input unit, and performs driving support control or automatic driving control of the own vehicle, based on the result of the analysis and the experience information of the another vehicle as received by said receiving unit,
wherein the experience information receiving unit and the optimized information generation unit are further configured to generate an input data set from the experience information and perform a machine learning algorithm based upon the input data set to generate a learning result associated with said optimized experience information,
wherein the control unit is further configured to perform a machine learning algorithm based upon data associated with the running situation of the own vehicle to generate a learning result based upon predictive analytics and perform the driving support control or the automatic driving control of the own vehicle based upon the learning result,
where the control unit performs driving support by adjusting a propulsive force of the own vehicle, a braking force of the own vehicle, or a steering angle of the own vehicle.

2. A computing system that provides an automobile with an experience information of another vehicle, wherein the computing system provided with a server computer;
said server computer, comprising:
an experience information receiving unit that receives the experience information of one or multiple vehicles;
an optimized information generating unit that generates an optimized experience information, based on said experience information, and
an experience information transmitting unit that transmits said optimized experience information to one or multiple vehicles, wherein said experience information received by said experience information receiving unit is the experience information associating a driving operation amount and a driving situation of each vehicle,
said automobile, comprising:
a receiving unit that receives an experience information of another vehicle which has an experience parked in a garage;
an input unit that inputs information on a running situation of an own vehicle; and
a control unit, wherein, said control unit analyzes the running situation of the own vehicle which constantly changes in real time, based on the information from said input unit, and performs driving support control or automatic driving control at the time the own vehicle enters the garage, based on the result of the analysis and the experience information at the time when the another vehicle enter the garage as received by said receiving unit,
wherein the experience information receiving unit and the optimized information generation unit are further configured to generate an input data set from the experience information and perform a machine learning algorithm on the input data set to generate a learning result associated with said optimized experience information based upon predictive analytics.

3. An automobile, comprising:
an automobile of claim 1 or claim 2,
a detection unit for generating data indicative of a surrounding of the automobile; and
a recognition system for generating a data set associated with the data generated by the detection unit and extracting features associated with objects from the data based upon a machine learning algorithm to detect on object in the surrounding based upon the data, the machine learning algorithm including one of Histograms of Oriented Gradients (HOG) and Support Vector Machine (SVM).

4. An automobile of claim 1 or claim 2, wherein said receiving unit receives the experience information of said another vehicle by communication between said own vehicle and a road.

5. An automobile of claim 1 or claim 2, wherein said receiving unit receives the experience information of said another vehicle by communication between said own vehicle and a portable terminal.

6. An automobile of claim 1 or claim 2, wherein said receiving unit receives the experience information of said another vehicle by communication between said own vehicle and a server computer.

7. The computing system of claim 2, further comprising an apparatus installed at a garage, the apparatus comprising:
- an experience information receiving unit that receives experience information at the time of entering from an automobile entered in the garage,
- an experience information storage unit that stores the experience information received by said experience information receiving unit, and
- an experience information transmitting unit that transmits the experience information stored in said experience information storage unit to a vehicle which is trying to enter the garage and to the server,
- wherein said experience information is associating a driving operation amount and a driving situation at the tune of entering of said automobile entered in the garage.

8. A computing system that provides the automobiles of claim 1 or claim 2, wherein the experience information of another vehicle received by the receiving unit of the automobile is experience information of another vehicle of the one or multiple vehicles.

9. A computing system of claim 8, wherein said optimized experience information is the experience information that energy consumption is optimized so as to minimize.

10. A computing system of claim 8, wherein said optimized experience information is the experience information that regenerative energy is optimized so as to maximize.

11. A computing system of claim 8, wherein said optimized experience information is the experience information that was optimized so as to minimize the acceleration count or acceleration time at a predetermined travel distance or a predetermined travel time.

12. A computing system of claim 8, wherein said optimized experience information is the experience information that was optimized so as to minimize or maximize the number of times of braking or braking time at a predetermined travel distance or a predetermined traveling time.

13. A computing system of claim 8, wherein said optimized experience information is the experience information that was optimized so that a distance traveled from a departure point to an arrival point is minimized.

14. A computing system of claim 8, wherein said optimized experience information is the experience information that was optimized so that traveling time from a departure point to an arrival point is minimized.

15. A computing system of claim 8, wherein said optimized experience information is the experience information that it was optimized so that the possibility that a vehicle of a provide destination of the experience information comes in contact with an obstacle becomes minimum.

* * * * *